United States Patent
Liu

(10) Patent No.: US 11,972,527 B2
(45) Date of Patent: Apr. 30, 2024

(54) METHOD AND APPARATUS FOR RECONSTRUCTING FACE MESH MODEL, AND STORAGE MEDIUM

(71) Applicant: BIGO TECHNOLOGY PTE. LTD., Singapore (SG)

(72) Inventor: Gengdai Liu, Guangzhou (CN)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 309 days.

(21) Appl. No.: 17/297,342

(22) PCT Filed: Nov. 13, 2019

(86) PCT No.: PCT/CN2019/117944
§ 371 (c)(1),
(2) Date: May 26, 2021

(87) PCT Pub. No.: WO2020/108304
PCT Pub. Date: Jun. 4, 2020

(65) Prior Publication Data
US 2022/0292776 A1    Sep. 15, 2022

(30) Foreign Application Priority Data
Nov. 29, 2018    (CN) .......................... 201811446646.7

(51) Int. Cl.
*G06T 17/20*    (2006.01)

(52) U.S. Cl.
CPC .................. *G06T 17/205* (2013.01)

(58) Field of Classification Search
CPC ....... G06T 17/20; G06T 17/205; G06T 17/30; G06T 2207/10028; G06T 2207/20016;
(Continued)

(56) References Cited

U.S. PATENT DOCUMENTS

| 5,886,702 A * | 3/1999 | Migdal ................. G06T 17/20 345/423 |
| 2001/0033675 A1* | 10/2001 | Maurer .................. G06T 7/246 382/103 |

(Continued)

FOREIGN PATENT DOCUMENTS

| CN | 102426712 A | 4/2012 |
| CN | 102663810 A | 9/2012 |

(Continued)

OTHER PUBLICATIONS

Lu, Xiaoguang, and Anil K. Jain. "Integrating range and texture information for 3D face recognition." 2005 Seventh IEEE Workshops on Applications of Computer Vision (WACV/Motion'05)—vol. 1. vol. 1. IEEE, 2005. (Year: 2005).*

(Continued)

*Primary Examiner* — Daniel F Hajnik
(74) *Attorney, Agent, or Firm* — Kolitch Romano Dascenzo Gates LLC

(57) ABSTRACT

Provided is a method for reconstructing a face mesh model. The method includes: acquiring face scanning data to be reconstructed and a three-dimensional face mesh template; obtaining a target face mesh model by hierarchically extracting key feature points in the 3D face mesh template and by sequentially deforming the 3D face mesh template based on posture matching positions of the hierarchically extracted key feature points in the face scanning data; and obtaining a reconstructed face mesh model by acquiring global feature points in the target face mesh model and by deforming the target face mesh model based on the posture matching positions of the global feature points in the face scanning data.

16 Claims, 6 Drawing Sheets

(58) Field of Classification Search
CPC . G06T 2207/20021; G06T 2207/30201; G06T 5/005; G06T 5/50; G06T 7/33; G06T 19/20; G06T 2219/2021
See application file for complete search history.

(56) References Cited

U.S. PATENT DOCUMENTS

| | | | |
|---|---|---|---|
| 2010/0214289 | A1 | 8/2010 | Xiao et al. |
| 2015/0310672 | A1 | 10/2015 | Choukroun |
| 2017/0091529 | A1* | 3/2017 | Beeler .................... G06T 7/246 |
| 2018/0122148 | A1* | 5/2018 | Janzer .................. G06T 15/503 |

FOREIGN PATENT DOCUMENTS

| | | | |
|---|---|---|---|
| CN | 103606190 | A | 2/2014 |
| CN | 105427385 | A | 3/2016 |
| CN | 106469465 | A | 3/2017 |
| CN | 107818578 | A | 3/2018 |
| CN | 109377563 | A | 2/2019 |

OTHER PUBLICATIONS

Abson, Karl, Hassan Ugail, and Stanley S. Ipson. "A methodology for feature based 3D face modelling from photographs." (2008); https://citeseerx.ist.psu.edu/document?repid=rep1&type=pdf&doi=398d53b967e1e9b4fbb73b51bfd9398dbf7d9d38 (Year: 2008).*

Roth, Joseph, Yiying Tong, and Xiaoming Liu. "Unconstrained 3D face reconstruction." Proceedings of the IEEE conference on computer vision and pattern recognition. 2015. (Year: 2015).*

Huber, Patrik, et al. "A multiresolution 3d morphable face model and fitting framework." International conference on computer vision theory and applications. vol. 5. SciTePress, 2016. (Year: 2016).*

Velho, Luiz, and Denis Zorin. "4-8 Subdivision." Computer Aided Geometric Design 18.5 (2001): 397-427. (Year: 2001).*

Examination Report from the Indian Patent Office dated Feb. 13, 2023 in Indian Application No. 202127024449, which is a foreign counterpart to this U.S. Application.

Zhou, Jia-Li, et al.; "A 3D Face Reconstruction and Recognition Method Based on Passive Binocular Stereo Vision"; Acta Automatica Sinica; vol. 35, No. 2; Feb. 2009.

International Search Report of the International Searching Authority for China National Intellectual Property Administration in PCT application No. PCT/CN2019/117944 dated Feb. 11, 2020, which is an international application corresponding to this U.S. application.

The State Intellectual Property Office of People's Republic of China, First Office Action in Patent Application No. CN201811446646.7 dated Mar. 19, 2020, which is a foreign counterpart application corresponding to this U.S. Patent Application, to which this application claims priority.

The State Intellectual Property Office of People's Republic of China, Second Office Action in Patent Application No. CN201811446646.7 dated Aug. 18, 2020, which is a foreign counterpart application corresponding to this U.S. Patent Application, to which this application claims priority.

Amberg, Brian, et al.; "Optimal Step Nonrigid ICP Algorithms for Surface Registration", Jun. 2007.

Brown, Benedict J., et al.; "Global Non-Rigid Alignment of 3-D Scans", ACM Transactions on Graphics, vol. 26, No. 3, Article 21, Jul. 2007.

Li, Hao, et al.; "Robust Single-View Geometry and Motion Reconstruction", ACM Transactions on Graphics, vol. 28, No. 5, Article 175, Dec. 2009.

Li, Hao, et al.; "Temporally Coherent Completion of Dynamic Shapes", ACM Transactions on Graphics, vol. 31, No. 1, Article 2, Jan. 2012.

Sumner, Robert W., et al.; "Embedded Deformation for Shape Manipulation", ACM Transactions on Graphics, vol. 26, No. 3, Article 80, Jul. 2007.

Sun, Xi; "Face 3D Reconstruction and Recognition Based on Binocular Stereo Vision"; Information & Technology, China Doctoral Dissertations Full-text Database, Sep. 15, 2011, ISSN: 1674-022X.

* cited by examiner

METHOD AND APPARATUS FOR RECONSTRUCTING FACE MESH MODEL, AND STORAGE MEDIUM

CROSS-REFERENCE TO RELATED APPLICATION

This application is a 371 of PCT Application No. PCT/CN2019/117944, filed on Nov. 13, 2019, which claims priority to Chinese Patent Application No. 201811446646.7, filed on Nov. 29, 2018. Both applications are incorporated herein by reference in their entirety.

TECHNICAL FIELD

Embodiments of the present disclosure relate to the field of image processing, and in particular, relate to a method and apparatus for reconstructing a face mesh model, and a device and a storage medium thereof.

BACKGROUND

With the development of video technologies, there are ever-growing demands for creating vivid face models in entertainment applications that require display of face images. However, it is a great challenge to create a vivid three-dimensional (3D) face model. Completely manual creation of a vivid 3D face model requires a lot of manpower and material resources. In the game and film industries, acquiring vivid faces/lifelike faces using a 3D scanning technology has become the mainstream, and this technology will become more and more popular as the price of 3D scanning hardware decreases. However, because scanning data acquired by using the 3D scanning technology generally includes noise and defects, and mesh models directly generated by the acquired scanning data do not have a consistent topological structure, a designer still has to undertake heavy work of transforming 3D scanning data into an accurate mesh model to obtain an accurate face mesh model when a series of vivid faces need to be created in batches.

To solve these problems, a 3D mesh registration algorithm is widely used, which deforms a mesh template model until the model matches the shape of the scanning data. In this case, it is necessary to acquire a series of accurate corresponding points between face scanning data and a face mesh template, and deform the face mesh template by sparse data interpolation to obtain a corresponding 3D face mesh model. Alternatively, a small number of points are collected in the face mesh template and matched with the scanning data to build a deformation graphics network, and corresponding post-processing is performed to obtain a corresponding 3D face mesh model.

SUMMARY

According to embodiments of the present disclosure, a method and apparatus for reconstructing a face mesh model, and a device and a storage medium are provided to solve some issues of low reconstruction speed and poor smoothness of a face mesh model in the related art, to achieve 3D reconstruction of the face mesh model, and to improve the reconstruction speed and the reconstruction effect of the face mesh model.

According to the embodiments of the present disclosure, a method for reconstructing a face mesh model is provided. The method includes: acquiring face scanning data to be reconstructed and a 3D face mesh template; obtaining a target face mesh model by hierarchically extracting key feature points in the 3D face mesh template and by sequentially deforming the 3D face mesh template based on posture matching positions of the hierarchically extracted key feature points in the face scanning data; and obtaining a reconstructed face mesh model by acquiring global feature points in the target face mesh model and by deforming the target face mesh model based on the posture matching positions of the global feature points in the face scanning data.

According to the embodiments of the present disclosure, an apparatus for reconstructing a face mesh model is provided. The apparatus includes: a processor; and a memory for storing at least one instruction executable by the processor; wherein the at least one instruction, when executed by the processor, enables the processor to perform a method for reconstructing a face mesh model including: acquiring face scanning data to be reconstructed and a 3D face mesh template; obtaining a target face mesh model by hierarchically extracting key feature points in the 3D face mesh template and by sequentially deforming the 3D face mesh template based on posture matching positions of the hierarchically extracted key feature points in the face scanning data; and obtaining a reconstructed face mesh model by acquiring global feature points in the target face mesh model and by deforming the target face mesh model based on the posture matching positions of the global feature points in the face scanning data.

According to the embodiments of the present disclosure, a non-transitory computer-readable storage medium storing a computer program is provided. The computer program, when run by a processor, causes the processor to perform a method for reconstructing a face mesh model including acquiring face scanning data to be reconstructed and a 3D face mesh template; obtaining a target face mesh model by hierarchically extracting key feature points in the 3D face mesh template and by sequentially deforming the 3D face mesh template based on posture matching positions of the hierarchically extracted key feature points in the face scanning data; and obtaining a reconstructed face mesh model by acquiring global feature points in the target face mesh model and by deforming the target face mesh model based on the posture matching positions of the global feature points in the face scanning data.

DETAILED DESCRIPTION

Figure 1:
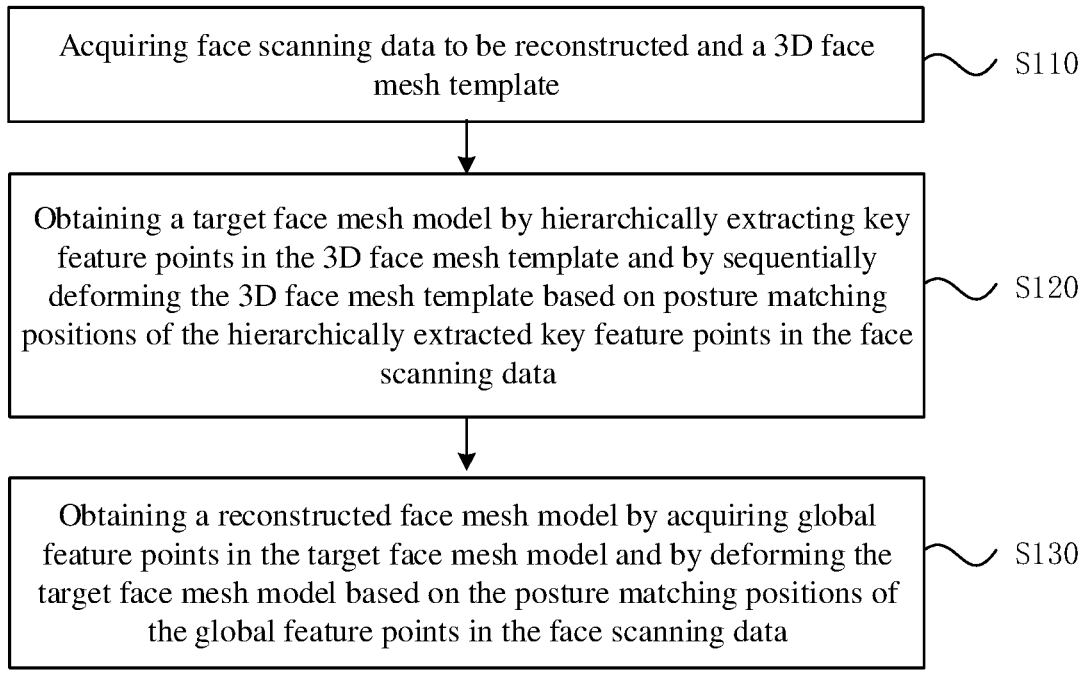
FIG. 1 is a flowchart of a method for reconstructing a face mesh model according to Embodiment 1 of the present disclosure.

The present disclosure is hereinafter described with reference to the accompanying drawings and specific embodiments. The specific embodiments described herein merely serve to explain but not to limit the present disclosure. For ease of description, only some but not all structures relevant to the present disclosure are shown in the drawings.

In the entertainment applications such as mobile phone applications (APP) or online games, resolution of the face mesh model is usually low, and it is still necessary to retain detailed features in the scanning data during gradual deformation for matching the scanning data. At this time, the speed in acquiring the accurate corresponding points between the face scanning data and the face mesh template is relatively low, and the whole process operation is cumbersome, which may lead to slow and unstable convergence. For the post-processing of the deformation graph network built with a small number of points, the problems of low speed and poor smoothness of the acquired 3D face mesh model may also arise.

According to the embodiments of the present disclosure, a 3D mesh registration algorithm is mainly hierarchically adopted to deform a 3D face mesh template, to match the deformed 3D face mesh template with face scanning data, and to match details of global feature points in the deformed 3D face mesh template again to obtain a reconstructed face mesh model. The approaches of the present disclosure solve the problems of low reconstruction speed and poor smoothness of a face mesh model in the related art and improves the smoothness of the reconstructed face mesh model.

Embodiment 1

FIG. 1 is a flowchart of a method for reconstructing a face mesh model according to Embodiment 1 of the present disclosure. This embodiment is applicable to any 3D model processing device that creates a vivid face mesh model based on face scanning data. The solution of this embodiment is applicable to the process of creating a corresponding vivid face mesh model or lifelike face mesh model based on the face scanning data. The method for reconstructing the face mesh model according to the embodiment of the present disclosure may be performed by an apparatus for reconstructing a face mesh model according to the embodiment of the present disclosure. The apparatus may be implemented by software and/or hardware and may be integrated with a device for performing this method. The device may be any 3D model processing device with image processing capabilities.

In an embodiment, referring to FIG. 1, the method may include S110 to S130.

In S110, face scanning data to be reconstructed and a 3D face mesh template are acquired.

Figure 2:
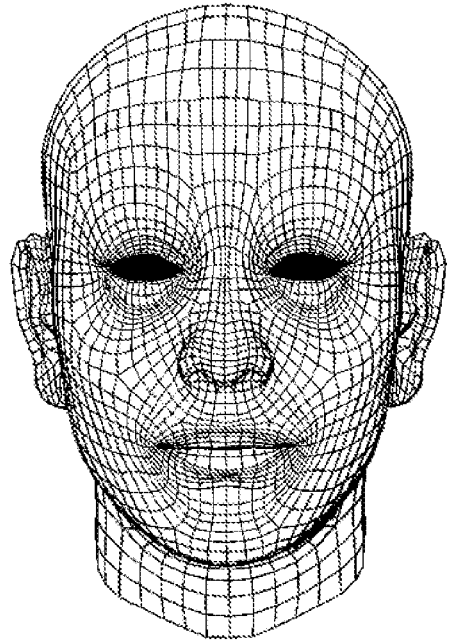
FIG. 2 is a schematic diagram of a low-precision 3D face mesh template according to Embodiment 1 of the present disclosure.
Figure 3:
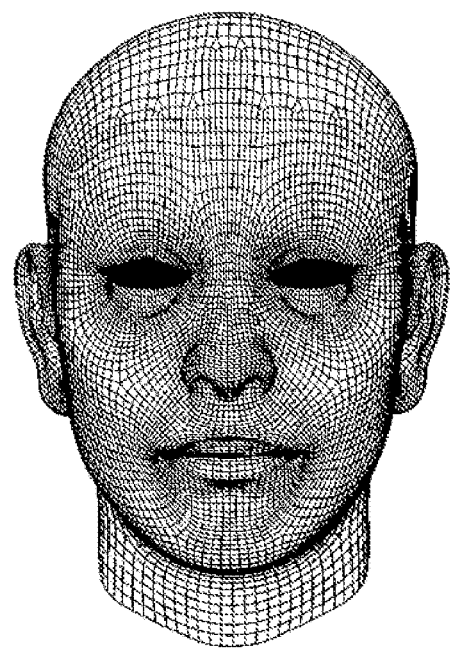
FIG. 3 is a schematic diagram of a high-precision 3D face mesh template according to Embodiment 1 of the present disclosure.

In this embodiment, the 3D face mesh template is a standard face mesh model. In some embodiments, the 3D face mesh template is a 3D face model, which is pre-created according to a standard face shape and added with mesh distribution indication. In the process of creating the 3D face mesh template, 3D face mesh templates with different precision may be created according to different pixel resolutions of selected models, that is, the meshes distributed number and the density in the created 3D face mesh templates are different. For example, a low-precision 3D face mesh template is shown in FIG. 2 and a high-precision 3D face mesh template is shown in FIG. 3. In this embodiment, during reconstruction of the face mesh model, the pre-created 3D face mesh template is stored in a 3D model processing device for performing the method for reconstructing the face mesh model in this embodiment, and different face scanning data may match the 3D face mesh template, such that a reconstructed face mesh model is obtained.

Figure 4:
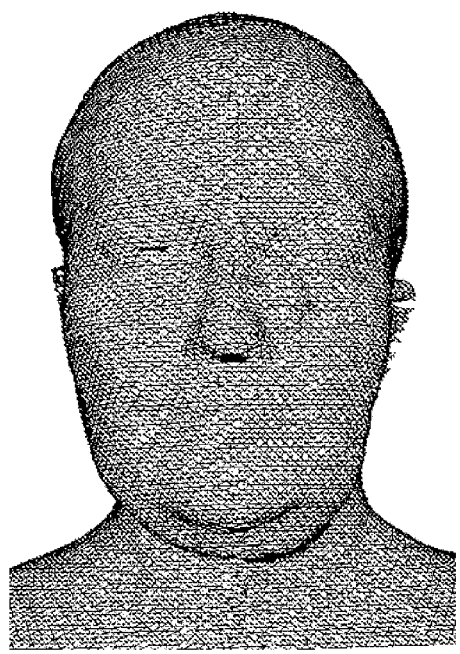
FIG. 4 is a schematic diagram of face scanning data according to Embodiment 1 of the present disclosure.

In addition, the face scanning data is 3D scanning data acquired by scanning the same type of faces according to different types of face mesh models required to be reconstructed, as shown in FIG. 4. The reconstructed face mesh model in this embodiment is mainly used for displaying video pictures containing facial expressions in entertainment applications or game websites; and in video products containing facial expressions, most facial expression animation technologies are data-driven. That is, these technologies rely on a parameterized model of a face mesh model with a plurality of expressions, which is established on one face database. Therefore, it is necessary to acquire a large number of vivid face mesh models from various original face scanning data containing different expressions, and thus to create the face database based on the models. In this case, for the required different expressions, a large number of different face scanning data may be acquired by a 3D scanning technology and directly pre-stored in the 3D model processing device for performing the method for reconstructing the face mesh model in this embodiment before the face mesh model is reconstructed, such that the face scanning data may be directly acquired during reconstruction of the face mesh model; or, during reconstruction of the face mesh model, face scanning data of corresponding expressions is scanned in real time by the 3D scanning technology, and hence the face mesh model is directly reconstructed, which is not limited in the embodiments of the present disclosure.

In some embodiments, during reconstruction of the face mesh model, first, the face scanning data corresponding to an expression may be selected based on expression information contained in the face mesh model needs to be reconstructed. The corresponding face scanning data may be directly acquired from a large number of pre-stored face scanning data; or a face with the corresponding expression is scanned in real time by the 3D scanning technology based on the expression information, and hence the corresponding face scanning data in this reconstruction process is obtained. In addition, during reconstruction of the face mesh model, it is also necessary to acquire a pre-stored 3D face mesh template, that is, a standard face mesh model, and different reconstructed face mesh models are obtained by matching the same 3D face mesh template with a plurality of different face scanning data. In this embodiment, the same 3D face mesh template is processed, which reduces noise and defects in the process of transforming the different face scanning data into the corresponding face mesh models, and solves the problem that the mesh models directly generated by the different face scanning data do not have a consistent topological structure.

In S120, a target face mesh model is obtained by hierarchically extracting key feature points in the 3D face mesh template, and by sequentially deforming the 3D face mesh template based on posture matching positions of the hierarchically extracted key feature points in the face scanning data.

The feature points are points in the model, which have distinct characteristics and may effectively reflect essential features of the model and identify target portions in the model. In this embodiment, the feature points refer to pixels that may represent facial features in the 3D face mesh template, that is, a plurality of mesh vertices distributed in the 3D face mesh template. The key feature points are local feature points in the 3D face mesh template. In some embodiments, the key feature points are feature points that may clearly represent positions of facial features such as eyes, nose, mouth and chin in the 3D face mesh template, or represent position details such as eye sockets and nose wings in all the mesh vertices. In addition, the posture matching position refers to a corresponding matching position of the same target portion in the face scanning data, which is determined based on the position of a target face portion represented by each key feature point in the 3D face mesh template. For example, the posture matching position of the feature point representing the nose in the 3D face mesh template in the face scanning data is the position of the nose in the face scanning data.

Figure 5:
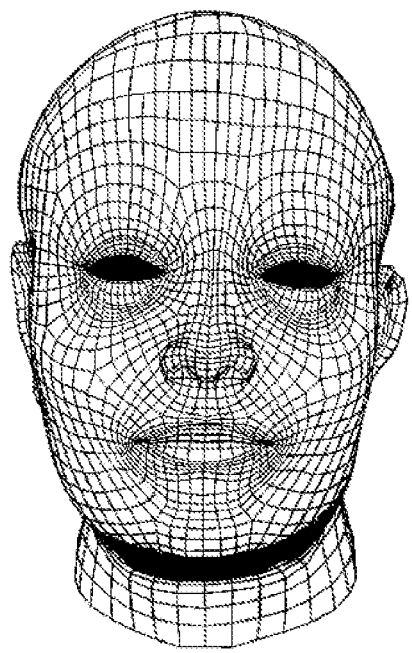
FIG. 5 is a schematic diagram of a result of registering a 3D face mesh template directly according to some feature points in related art.

In this embodiment, in order to match the 3D face mesh template with the face scanning data, first, it is necessary to determine the feature points in the 3D face mesh template and to control the 3D face mesh template to deform based on the matching positions of the feature points in the face scanning data, such that the positions of the feature points in the deformed 3D face mesh template match the positions of the feature points in the face scanning data one by one. In the related art, all the feature points in the face scanning data that are accurately corresponding to the 3D face mesh template are acquired, and the 3D face mesh template is deformed by sparse data interpolation to reconstruct the corresponding face mesh model. However, deforming based on all the feature points makes results in a low efficiency of reconstructing the face mesh model, and it is difficult to acquire some accurately corresponding feature points in advance. In another approach, if the reconstructed face mesh model is obtained by deforming based on some feature points, detailed features in the reconstructed face mesh model are unclear due to few feature points included, resulting in poor smoothness of the reconstructed face mesh model. The result of directly matching some feature points with the face scanning data is shown in FIG. 5, and the detailed features of the matched face mesh model are unclear and the overall smoothness is poor.

Therefore, in this embodiment, the key feature points in the 3D face mesh template are hierarchically extracted and sequentially matched with the face scanning data, so as to solve the problems that the speed in reconstructing the face mesh model is very low when all the feature points are extracted, and the problems that detailed features of the reconstructed face mesh model are unclear when some feature points are extracted. In some embodiments of the present disclosure, the key feature points in the 3D face mesh template may be hierarchically extracted by such algorithms as a scale-invariant feature transform (SIFT) algorithm and a features from accelerated segment test (FAST) algorithm, the posture matching positions of the plurality of hierarchically extracted key feature points in the face scanning data are sequentially determined, and the corresponding 3D face mesh template are sequentially controlled to deform based on the corresponding posture matching positions to obtain a target face mesh model that matches the face scanning data.

Exemplarily, the corresponding face scanning data and an original 3D face mesh template are acquired, some mesh vertices are extracted from the original 3D face mesh template as key feature points, and the posture matching positions of the plurality of key feature points extracted this time in the face scanning data are determined, such that the original 3D face mesh template is driven to deform based on the posture matching positions. The positions of the key feature points extracted this time in the deformed 3D face mesh template are made to correspond to the posture matching positions of the key feature points in the face scanning data. The original 3D face mesh template may also drive other feature points not extracted this time to move during deformation, but the degree of matching between the positions of the feature points not extracted in the deformed 3D face mesh template and the posture matching positions of the feature points not extracted in the face scanning data is low, that is, the similarity between the deformed 3D face mesh template and the face scanning data is low. Therefore, some mesh vertices other than the key feature points extracted at the first time may be continuously extracted from the 3D face mesh template deformed at the first time as secondarily extracted key feature points, the posture matching positions of the secondarily extracted key feature points in the face scanning data may be determined, the 3D face mesh template deformed at the first time may be continuously driven to deform again based on the posture matching positions, and the corresponding 3D face mesh template are circularly or repeatedly deformed in sequence with reference to the above process based on the hierarchically extracted key feature points until these templates accurately match the face scanning data, thereby obtaining the corresponding target face mesh model. In this embodiment, the key feature points are hierarchically acquired, and the 3D face mesh templates are sequentially deformed based on the posture matching positions in the face scanning data, such that the sequentially deformed 3D face mesh templates are gradually approximate to the face scanning data, and the computation amount in the subsequent deformation process is gradually reduced. Compared with the approaches of deforming the 3D face mesh template based on all the feature points and matching these feature points with the face scanning data at one time, the computation amount of the present disclosure in the deformation process is gradually reduced, and the reconstruction speed of the face mesh model is improved.

In some embodiments, during deformation of the 3D face mesh template, when other feature points other than the key feature points move along with the deformation of the 3D face mesh template, some constraints are met to ensure the movement consistency of a plurality of mesh vertices during deformation of the 3D face mesh template. Accordingly, in this embodiment, sequentially deforming the 3D face mesh template based on the posture matching positions of the hierarchically extracted key feature points in the face scanning data may include S1210 to S1220.

In S1210, the posture matching positions of the hierarchically extracted key feature points in the face scanning data are determined by an iterative closest point (ICP) algorithm.

In this embodiment, the ICP algorithm is a point alignment method based on contour features, which mainly determines a transform relationship between two piles of point cloud data, that is, a transform relationship between a plurality of key feature points in the 3D face mesh template and corresponding feature points in the face scanning data in this embodiment. In some embodiments, a nearest point of each key feature point in the 3D face mesh template in the face scanning data may be calculated, and alignment between the key feature point and the nearest point may be calculated by using a minimum root mean square algorithm to acquire corresponding coordinate transformation, and the transformed 3D face mesh template is determined. In this case, a root mean square error between the transformed 3D face mesh template and the face scanning data may be calculated, and an iterative operation is sequentially performed accordingly to determine a final matching transform relationship. In some embodiments, after the key feature points are hierarchically extracted, the posture matching positions of the hierarchically extracted key feature points in the face scanning data may be sequentially determined based on the transform relationship between the 3D face mesh template and the face scanning data determined by the ICP algorithm. That is, the posture matching positions of the initially extracted key feature points in the face scanning data are determined by the ICP algorithm, the original 3D face mesh template is deformed, key feature points are secondarily extracted from the initially deformed 3D face mesh template, the posture matching positions of the secondarily extracted key feature points in the face scanning data are determined by the ICP algorithm, the initially deformed 3D face mesh template is deformed again, and analogously, the posture matching positions of the hierarchically extracted key feature points in the face scanning data are determined, so as to deform the corresponding 3D face mesh template.

In S1220, the 3D face mesh template is sequentially deformed, using a 3D registration algorithm, based on the posture matching positions of the hierarchically extracted key features points in the face scanning data.

In this embodiment, the 3D mesh registration algorithm is a model matching algorithm, which may gradually deform a 3D face mesh template until the template matches the 3D shape of the face scanning data. In this embodiment, first, regarding the hierarchically extracted key feature points, a low-resolution mesh model is reconstructed for the 3D face mesh template. Then, by deforming the low-resolution mesh model, the corresponding 3D face mesh template is driven to project on the face scanning data, that is, to deform the 3D face mesh template. In this case, the deformation of the 3D face mesh template may be achieved by minimizing an energy function which may be optimized by the Gaussian Newton iterative algorithm. In this case, the energy function may be:

$$E = E_{fit} + \alpha E_{rigid} + \beta E_{smooth}.$$

In this energy function, $E_{fit}$ may ensure that the key feature points in the 3D face mesh template deformed each time match the posture matching positions in the face scanning data; $\alpha E_{rigid}$ may ensure that the motion of the plurality of feature points in the low-resolution mesh model (that is, the key feature points in the 3D face mesh template) includes only rotation and translation, and $\alpha$ is a weight coefficient of $E_{rigid}$; and $\beta E_{smooth}$ may be used to keep the motion among the plurality of feature points (the key feature points and other feature points) as consistent as possible, so as to avoid unsmooth results, and $\beta$ is a weight coefficient of $E_{smooth}$.

The energy function may determine the constraint conditions that other feature points meet during the deformation of the corresponding 3D face mesh template, so as to ensure the smoothness of the reconstructed face mesh model.

For $E_{fit}$, a point-to-point distance and a point-to-surface distance are used in this embodiment, that is, a distance between the key feature points in the 3D face mesh template and the nearest point in the face scanning data, and the distance between the plurality of key feature points and the face scanning data:

$$E_{fit} \Sigma_{v_i, c_i \in C} \|n_i^T(v_i - c_i)\|^2 + \gamma \|v_i - c_i\|^2.$$

In this formula, $n_i$ is a normal vector of the key feature point $v_i$ in the 3D face mesh template at the nearest point $c_i$ in the face scanning data, which may allow a plurality of key feature points to slide tangentially and appropriately along the face scanning data to increase the robustness in the deformation process; i is an index (or serial number) of the mesh vertices; and $\gamma$ is a weight coefficient.

In some embodiments, by the above formula, the corresponding 3D face mesh template may be sequentially deformed, using the 3D mesh registration algorithm, based on the posture matching positions of the hierarchically extracted key feature points in the face scanning data, and the motion of other feature points in the deformation process may be restrained to ensure the movement consistency of the feature points and to improve the smoothness of the reconstructed face mesh model.

In this embodiment, the 3D face mesh template is hierarchically deformed in three levels, that is, the deformation matching processing is performed three times, which may ensure that the similarity between the deformed target face mesh model and the face scanning data is higher. In this embodiment, the number of hierarchical deformations is not limited and may be determined according to the similarity between the deformed 3D face mesh template and the face scanning data.

In S130, a reconstructed face mesh model is obtained by acquiring global feature points in the target face mesh model and by deforming the target face mesh model based on the posture matching positions of the global feature points in the face scanning data.

In this embodiment, as the target face mesh model is acquired by matching the 3D face mesh template with the face scanning data for many times and by deforming the 3D face mesh template for many times, the target face mesh model is also a mesh model. In this case, the global feature points are all the mesh vertices distributed in the target face mesh model.

In some embodiments, the target face mesh model is obtained by matching the 3D face mesh template with the face scanning data for many times and by deforming the 3D face mesh template for many times, such that the high similarity between the target face mesh model and the face scanning data can be ensured. In order to reconstruct the detailed features in the target face mesh model, and obtain a face mesh model that is more similar to and better matches the face scanning data, in this embodiment, the target face mesh model may be deformed by acquiring the global feature points in the target face mesh model with reference to the deformation process mentioned in S120 based on the posture matching positions of the plurality of global feature points in the face scanning data, so as to ensure that the reconstructed face mesh model is smooth enough, while more detailed features may be reconstructed as much as possible. The face mesh model that is more similar to the face scanning data may be acquired by optimization, so as to obtain the reconstructed face mesh model. As the similarity between the target face mesh model and the face scanning data is higher at this time, the deformation process performed in this post-processing based on the posture matching positions of the global feature points in the face scanning data is relatively simple, the calculation amount is low, less time of a developer is consumed, and a favorable reconstruction effect may be achieved.

Figure 6:
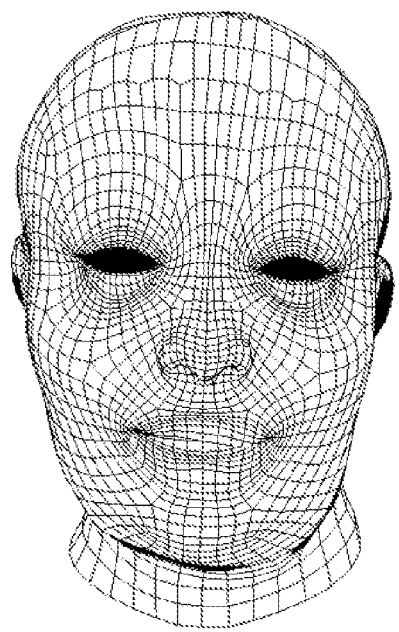
FIG. 6 is a schematic diagram of a result of post-processing a deformed 3D face mesh template in related art.

In the related art, the post-processing of the 3D face mesh template is to reconstruct the detailed features in the target face mesh model by projecting to the face scanning data only once along a normal direction of the 3D face mesh template. The post-processing result may be shown in FIG. 6. It can be seen that the smoothness of the face mesh model reconstructed by the post-processing method in the related art is poor. However, the post-processing in this embodiment may be to reconstruct details of the target face mesh model by constantly modifying the weight a of regular terms acquired by an iterative solution in the linear equations shown as below:

$$\begin{bmatrix} \alpha M \\ WI \end{bmatrix} T = \begin{bmatrix} 0 \\ WD \end{bmatrix}.$$

In the linear equations, M is a regularization matrix that constrains the movement consistency between the global feature points, D and W are displacement of the global feature points to the posture matching positions in the face scanning data and the weight of each global feature point respectively, T is actual displacement of each global feature point in the deformation process, and I is a unit matrix.

In the technical solution according to this embodiment, the key feature points in the 3D face mesh template are hierarchically extracted and hierarchically matched with the face scanning data, and the details of the matched model are reconstructed by using the global feature points to obtain the reconstructed face mesh model. In this way, the problems of low reconstruction speed and poor smoothness of the face mesh model in the related art are solved, 3D reconstruction of the face mesh model is achieved, the reconstruction speed and the reconstruction effect of the face mesh model are improved, and the smoothness of the reconstructed face mesh model is improved.

Embodiment 2

Figure 7:
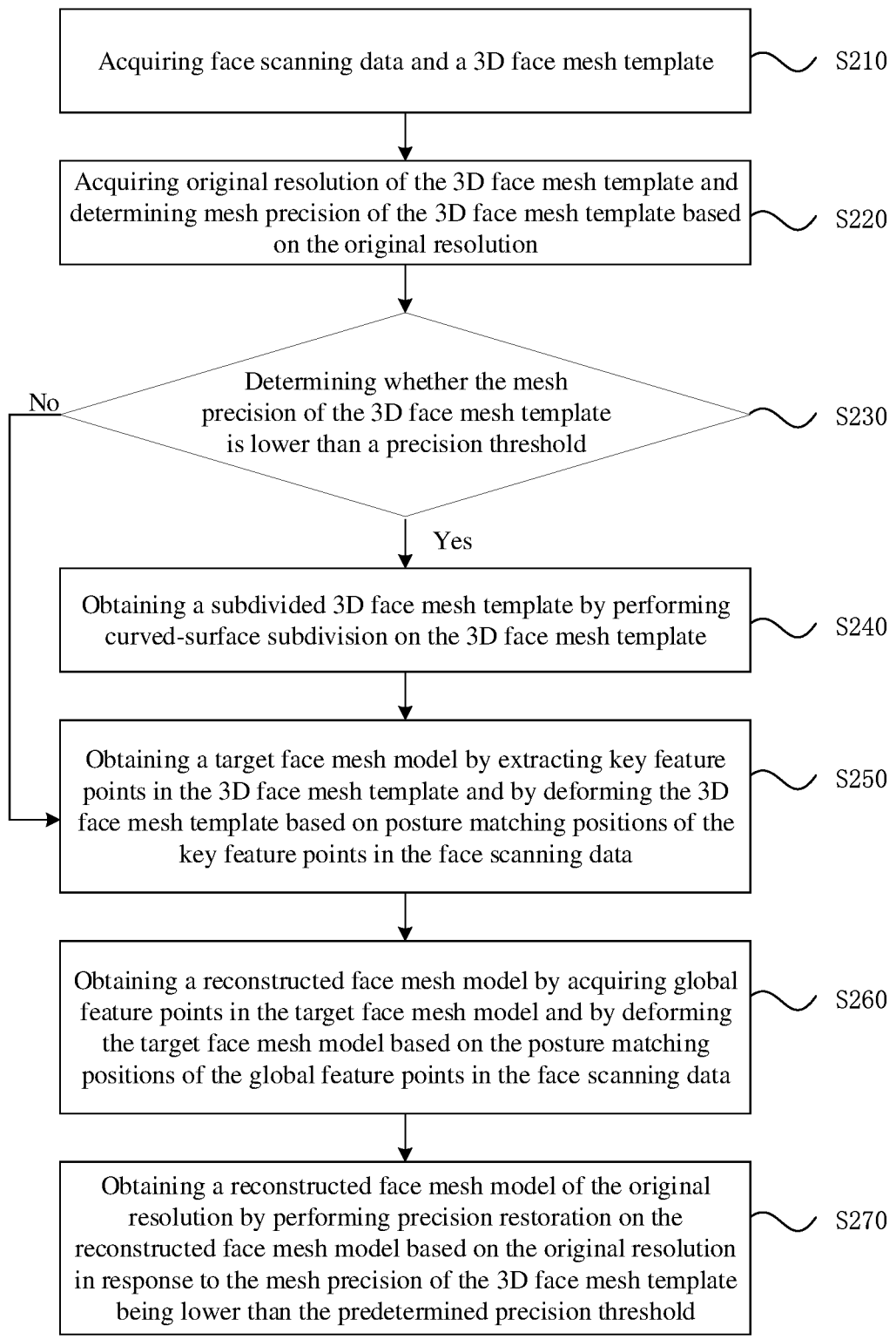
FIG. 7 is a flowchart of another method for reconstructing a face mesh model according to Embodiment 2 of the present disclosure.

FIG. 7 is a flowchart of another method for reconstructing a face mesh model according to Embodiment 2 of the present disclosure. The present embodiment is based on the above embodiment. Referring to FIG. 7, the method according to this embodiment may include S210 to S270.

In S210, face scanning data to be reconstructed and a 3D face mesh template are acquired.

In S220, original resolution of the 3D face mesh template is acquired and mesh precision of the 3D face mesh template is determined based on the original resolution.

In some embodiments, in the process of creating the 3D face mesh template, the higher the pixel resolution of a selected model is, the more meshes are distributed in the 3D face mesh template, and the more energy and the higher cost are needed for a developer to invest accordingly. Therefore, during reconstruction of the face mesh model, the developer usually selects a 3D face mesh template with medium precision to match the face scanning data. In this case, for improvement of the reconstruction effect of the face mesh model, the precision of the 3D face mesh template with the medium precision, that is, the pixel resolution of the model, needs to be first processed accordingly.

In this embodiment, after the 3D face mesh template is acquired, for improvement of the reconstruction effect of the face mesh model, the original resolution of the 3D face mesh template is first determined, and the mesh precision of the 3D face mesh template being constructed is determined based on the original resolution, so as to facilitate follow-up processing of a high-precision 3D face mesh template.

In S230, whether the mesh precision of the 3D face mesh template is lower than a predetermined precision threshold is determined. If the mesh precision of the 3D face mesh template is lower than the predetermined precision threshold, S240 is performed; and otherwise, S250 is performed.

In some embodiments, after the mesh precision of the 3D face mesh template is determined, it is necessary to determine whether the mesh precision is lower than the predetermined precision threshold. If the mesh precision of the 3D face mesh template is lower than the predetermined precision threshold, the original resolution of the 3D face mesh template acquired this time is low, and it is necessary to acquire a corresponding high-precision 3D face mesh template to improve the reconstruction effect of the face mesh model. If the mesh precision of the 3D face mesh template is not lower than the predetermined precision threshold, the original resolution of the 3D face mesh template acquired this time is relatively high, the requirements on the reconstruction effect of the reconstructed face mesh model are satisfied, and at this time, the 3D face mesh template with the mesh precision may be processed directly.

In S240, a subdivided 3D face mesh template is obtained by performing curved-surface subdivision on the 3D face mesh template.

In some embodiments, curved-surface subdivision is to automatically embed new vertices between mesh vertices in a low-precision 3D face mesh template. After a large number of new vertices are automatically inserted, the curved-surface of the 3D face mesh template is divided into very fine portions that appear smoother and denser. Curved-surface subdivision is a technology that may automatically create vertices inside a model chip and refine the model, so as to achieve a better picture effect. Curved-surface subdivision may automatically create hundreds of vertices similar to those of the original model, which are not virtual vertices but real vertices. The vertices created by curved-surface subdivision are equivalent to those designed directly during modeling. Therefore, performing curved-surface subdivision on the low-precision 3D face mesh template to obtain a high-precision 3D face mesh template has the same effect as directly creating a high-precision 3D face mesh template during modeling. However, by curved-surface subdivision, the time and cost can be considerably reduced for the developer, and the same effect is still achieved.

Therefore, in this embodiment, when it is determined that the mesh precision of the 3D face mesh template is lower than the predetermined precision threshold, corresponding curved-surface subdivision operations may be performed on the low-precision 3D face mesh template by means of the curved-surface subdivision algorithm, so as to obtain the subdivided 3D face mesh template, and corresponding subsequent operations may be performed on the subdivided 3D face mesh template to obtain the reconstructed face mesh model, thus improving the smoothness of the reconstructed face mesh model.

In S250, a target face mesh model is obtained by hierarchically extracting key feature points in the 3D face mesh template, and by sequentially deforming the 3D face mesh template based on posture matching positions of the hierarchically extracted key feature points in the face scanning data.

In S260, a reconstructed face mesh model is obtained by acquiring global feature points in the target face mesh model and by deforming the target face mesh model based on the posture matching positions of the global feature points in the face scanning data.

In S270, a reconstructed face mesh model of the original resolution is obtained by performing precision restoration on the reconstructed face mesh model based on the original resolution in response to the mesh precision of the 3D face mesh template being lower than the predetermined precision threshold.

Figure 8:
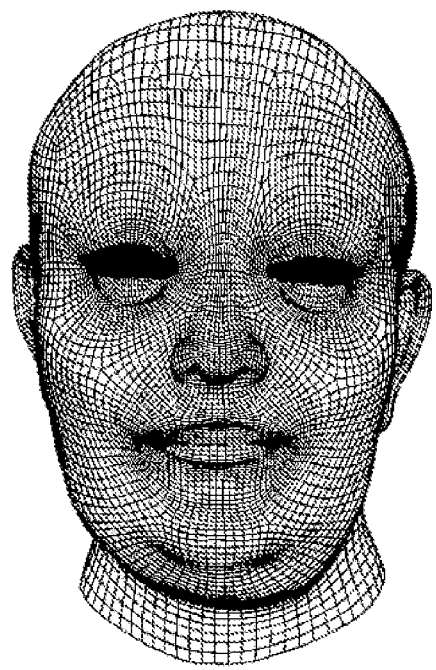
FIG. 8 is a schematic diagram of a result of registering a subdivided 3D face mesh template according to Embodiment 2 of the present disclosure.
Figure 9:
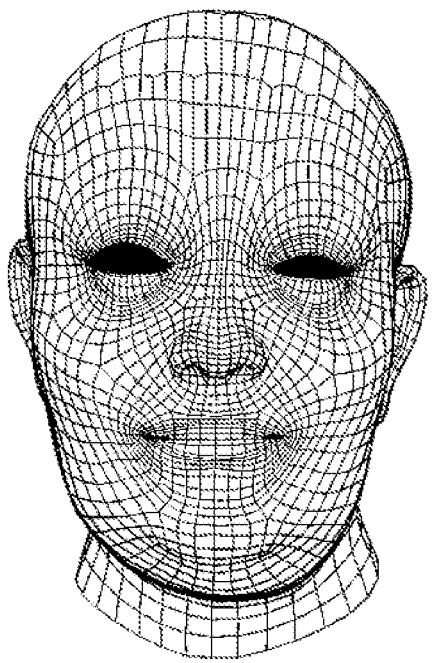
FIG. 9 is a schematic diagram of a result of precision restoration of a reconstructed high-precision face mesh model according to Embodiment 2 of the present disclosure.

In some embodiments, after curved-surface subdivision is performed on the original 3D face mesh template, the follow-up operations of hierarchically extracting the key feature points and sequentially deforming the 3D face mesh template based on the posture matching positions of the key features points in the face scanning data are also corresponding operations for the subdivided 3D face mesh template. The reconstructed face mesh model obtained at this time is also a high-precision face mesh model as shown in FIG. 8. Accordingly, compared with the result shown in FIG. 5 acquired by directly matching some feature points with the face scanning data in the related art, the method of hierarchically registering the subdivided 3D face mesh template in this embodiment may obviously improve the reconstruction effect of the face mesh model. At this time, in order to obtain the face mesh model of the original resolution, it is necessary to perform precision restoration on the reconstructed high-precision face mesh model based on the original resolution of the 3D face mesh template, that is, to extract the mesh vertices of the original resolution from the high-precision face mesh model and to remove redundant mesh vertices, so as to obtain the face mesh model of the original resolution shown in FIG. 9 as the final reconstructed face mesh model. Compared with the result shown in FIG. 6 obtained by the post-processing technology in the related art, the detailed features in the reconstructed face mesh model are more perfect, which effectively improves the reconstruction effect of the face mesh model.

In the technical solution according to this embodiment, curved-surface subdivision is performed on the low-precision 3D face mesh template to obtain the high-precision 3D face mesh template, and the face mesh model is reconstructed based on the high-precision 3D face mesh template, thus improving the reconstruction speed and the reconstruction effect of the face mesh model, and improving the smoothness of the reconstructed face mesh model.

Embodiment 3

Figure 10:
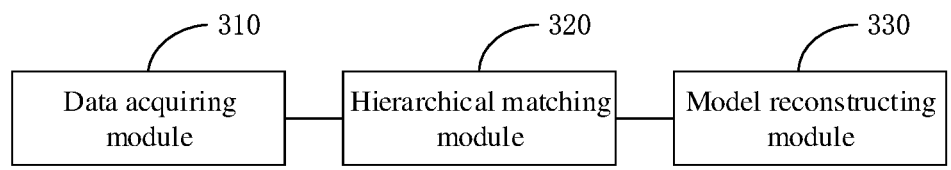
FIG. 10 is a structural schematic diagram of an apparatus for reconstructing a face mesh model according to Embodiment 3 of the present disclosure.

FIG. 10 is a structural schematic diagram of an apparatus for reconstructing a face mesh model according to Embodiment 3 of the present disclosure. As shown in FIG. 10, the apparatus may include: a data acquiring module 310, configured to acquire face scanning data to be reconstructed and a 3D face mesh template; a hierarchical matching module 320, configured to obtain a target face mesh model by hierarchically extracting key feature points in the 3D face mesh template and by sequentially deforming the 3D face mesh template based on posture matching positions of the hierarchically extracted key feature points in the face scanning data, and a model reconstructing module 330, configured to obtain a reconstructed face mesh model by acquiring global feature points in the target face mesh model and by deforming the target face mesh model based on the posture matching positions of the global feature points in the face scanning data.

In the technical solutions according to this embodiment, the reconstructed face mesh model is obtained by hierarchically extracting the key feature points in the 3D face mesh template, hierarchically matching the key feature points with the face scanning data, and reconstructing details of the matched model using the global feature points. In this way, the problems of low reconstruction speed and poor smoothness of a face mesh model in the related art are solved, reconstruction of the face mesh model is achieved, the reconstruction speed and the reconstruction effect of the face mesh model are improved, and the smoothness of the reconstructed face mesh model is improved.

In some embodiments, the hierarchical matching module 320 may include a position matching unit configured to determine, using an ICP algorithm, the posture matching positions of the hierarchically extracted key feature points in the face scanning data, and a hierarchical registering unit configured to sequentially deform, using a 3D mesh registration algorithm, the 3D face mesh template based on the posture matching positions of the hierarchically extracted key features points in the face scanning data.

In some embodiments, the apparatus for reconstructing the face mesh model may further include: a precision determining module, configured to acquire original resolution of the 3D face mesh template and to determine mesh precision of the 3D face mesh template based on the original resolution prior to hierarchically extracting the key feature points in the 3D face mesh template; and a curved-surface subdividing module, configured to acquire a subdivided 3D face mesh template by performing curved-surface subdivision on the 3D face mesh template in response to the mesh precision of the 3D face mesh template being lower than a predetermined precision threshold.

In some embodiments, the apparatus for reconstructing the face mesh model may further include:

a precision restoring module, configured to obtain a reconstructed face mesh model of the original resolution by performing precision restoration on the reconstructed face mesh model based on the original resolution in response to obtaining the reconstructed face mesh model.

The apparatus for reconstructing the face mesh model according to this embodiment may be configured to perform the method for reconstructing the face mesh model according to any of the above embodiments, and have corresponding functions and beneficial effects.

Embodiment 4

Figure 11:
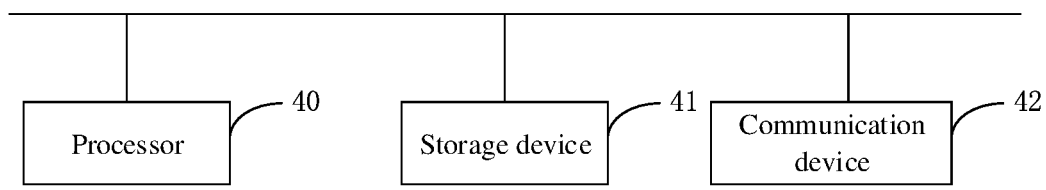
FIG. 11 is a structural schematic diagram of a device according to Embodiment 4 of the present disclosure.

FIG. 11 is a structural schematic diagram of a device according to Embodiment 4 of the present disclosure. As shown in FIG. 11, the device includes a processor 40, a storage device 41, and a communication device 42. At least one processor 40 may be configured in the device, and one processor 40 is taken as an example in FIG. 11. The processor 40, the storage device 41, and the communication device 42 in the device may be communicably connected by a bus or the like, and connection by a bus is taken as an example in FIG. 11.

As a computer-readable storage medium, the storage device 41 may be configured to store software programs, computer-executable programs, and modules, such as program instructions/modules corresponding to the methods for reconstructing the face mesh model in the embodiments of the present disclosure. The processor 40 executes at least one functional application and data processing of the device by running the software programs, instructions and modules stored in the storage device 41, that is, performs the methods for reconstructing the face mesh model.

The storage device 41 may mainly include a program storage area and a data storage area. In the storage device 41, the program storage area may store an operating system and an application required by at least one function, and the data storage area may store data created according to the use of a terminal. Moreover, the storage device 41 may include a high-speed random-access memory and may further include a non-volatile memory, such as at least one disk memory, a flash memory, or other non-volatile solid-state memories. In some examples, the storage device 41 may include memories remotely disposed relative to the processor 40, and these remote memories may be connected to the computer device via a network. Examples of the network include, but not limited to, the Internet, intranets, local area networks, mobile radio communications, or any combination thereof.

The communication device 42 may be configured to achieve network connection or mobile data connection between devices.

The device according to this embodiment may be configured to perform the method for reconstructing the face mesh model according to any of the above embodiments, and have corresponding functions and beneficial effects.

Embodiment 5

According to Embodiment 5 of the present disclosure, a computer-readable storage medium storing a computer program is further provided. The computer program, when run by a processor, causes the processor to perform the method for reconstructing the face mesh model as defined in any one of the above embodiments. The method may include:

acquiring face scanning data to be reconstructed and a 3D face mesh template;

obtaining a target face mesh model by hierarchically extracting key feature points in the 3D face mesh template and by sequentially deforming the 3D face mesh template based on posture matching positions of the hierarchically extracted key feature points in the face scanning data; and obtaining a reconstructed face mesh model by acquiring global feature points in the target face mesh model and by deforming the target face mesh model based on posture matching positions of the global feature points in the face scanning data.

According to an embodiment of the present disclosure, a storage medium storing instructions executable by a computer is provided. Not limited to the above method operations, the instructions, when run by the computer, may cause the computer to perform related operations in the method for reconstructing the face mesh model according to any embodiment of the present disclosure.

From the above descriptions of the embodiments, those skilled in the art can learn about that the present disclosure may be implemented by means of software and necessary general hardware or may also be implemented by hardware. The technical solutions of the present disclosure essentially or the portions that contribute to the related art may be embodied in the form of computer software products that may be stored in a computer-readable storage medium, such as a floppy disk, a read-only memory (ROM), a random-access memory (RAM), a flash memory, a hard disk, or optical disk of a computer, including a plurality of instructions to enable a computer device (which may be a personal computer, a server, a network device, or the like) to perform the method described in any embodiment of the present disclosure.

In the embodiment of the apparatus for reconstructing the face mesh model, the included units and modules are only classified according to the functional logic but are not limited to the above classification as long as the corresponding functions can be realized. In addition, the name of each functional unit is only for the convenience of description and differentiation and is not used to limit the scope of protection of the present disclosure.

What is claimed is:

1. A method for reconstructing a face mesh model, comprising:

acquiring face scanning data to be reconstructed and a three-dimensional (3D) face mesh template;

obtaining a target face mesh model by hierarchically extracting key feature points in the 3D face mesh template and by sequentially deforming the 3D face mesh template based on posture matching positions of the hierarchically extracted key feature points in the face scanning data, wherein the key feature points are local feature points in the 3D face mesh template and represent facial features and position details; and obtaining a reconstructed face mesh model by acquiring global feature points in the target face mesh model and by deforming the target face mesh model based on the posture matching positions of the global feature points in the face scanning data, wherein the global feature points are all mesh vertices distributed in the target face mesh model, wherein hierarchically extracting key feature points in the 3D face mesh template comprises:

continually extracting key feature points from the remaining feature points except previously extracted key feature points from a previous deformed 3D face mesh template.

2. The method according to claim 1, wherein sequentially deforming the 3D face mesh template based on the posture matching positions of the hierarchically extracted key feature points in the face scanning data comprises:

determining, using an iterative closest point (ICP) algorithm, the posture matching positions of the hierarchically extracted key feature points in the face scanning data; and sequentially deforming, using a 3D mesh registration algorithm, the 3D face mesh template based on the posture matching positions of the hierarchically extracted key features points in the face scanning data.

3. The method according to claim 2, wherein prior to extracting the key feature points in the 3D face mesh template, the method further comprises:

acquiring original resolution of the 3D face mesh template and determining mesh precision of the 3D face mesh template based on the original resolution; and obtaining a subdivided 3D face mesh template by performing curved-surface subdivision on the 3D face mesh template in response to the mesh precision of the 3D face mesh template being lower than a predetermined precision threshold.

4. The method according to claim 1, wherein prior to hierarchically extracting the key feature points in the 3D face mesh template, the method further comprises:

acquiring original resolution of the 3D face mesh template and determining mesh precision of the 3D face mesh template based on the original resolution; and obtaining a subdivided 3D face mesh template by performing curved-surface subdivision on the 3D face mesh template in response to the mesh precision of the 3D face mesh template being lower than a predetermined precision threshold.

5. The method according to claim 4, wherein in response to obtaining the reconstructed face mesh model, the method further comprises:
obtaining a reconstructed face mesh model of the original resolution by performing precision restoration on the reconstructed face mesh model based on the original resolution.

6. The method according to claim 1, wherein the 3D face mesh template is pre-created and stored in a 3D model processing device for performing the method.

7. An apparatus for reconstructing a face mesh model, comprising:
a processor; and
a memory for storing at least one instruction executable by the processor;
wherein the at least one instruction, when executed by the processor, enables the processor to perform a method for reconstructing a face mesh model comprising:
acquiring face scanning data to be reconstructed and a three-dimensional (3D) face mesh template;
obtaining a target face mesh model by hierarchically extracting key feature points in the 3D face mesh template and by sequentially deforming the 3D face mesh template based on posture matching positions of the hierarchically extracted key feature points in the face scanning data, wherein the key feature points are local feature points in the 3D face mesh template and represent facial features and position details; and
obtaining a reconstructed face mesh model by acquiring global feature points in the target face mesh model and by deforming the target face mesh model based on the posture matching positions of the global feature points in the face scanning data, wherein the global feature points are all mesh vertices distributed in the target face mesh model,
wherein hierarchically extracting key feature points in the 3D face mesh template comprises:
continually extracting key feature points from the remaining feature points except previously extracted key feature points from a previous deformed 3D face mesh template.

8. The apparatus according to claim 7, wherein deforming the 3D face mesh template based on the posture matching positions of the key feature points in the face scanning data comprises:
determining, using an iterative closest point (ICP) algorithm, the posture matching positions of the hierarchically extracted key feature points in the face scanning data; and
sequentially deforming, using a 3D mesh registration algorithm, the 3D face mesh template based on the posture matching positions of the hierarchically extracted key features points in the face scanning data.

9. The apparatus according to claim 8, wherein prior to extracting the key feature points in the 3D face mesh template, the method performed by the processor further comprises:
acquiring original resolution of the 3D face mesh template and determining mesh precision of the 3D face mesh template based on the original resolution; and
obtaining a subdivided 3D face mesh template by performing curved-surface subdivision on the 3D face mesh template in response to the mesh precision of the 3D face mesh template being lower than a predetermined precision threshold.

10. The apparatus according to claim 7, wherein prior to extracting the key feature points in the 3D face mesh template, the method performed by the processer further comprises:
acquiring original resolution of the 3D face mesh template and to determine mesh precision of the 3D face mesh template based on the original resolution; and
obtaining a subdivided 3D face mesh template by performing curved-surface subdivision on the 3D face mesh template in response to the mesh precision of the 3D face mesh template being lower than a precision threshold.

11. The apparatus according to claim 10, wherein in response to obtaining the reconstructed face mesh model, the method performed by the processor further comprises:
obtaining a reconstructed face mesh model of the original resolution by performing precision restoration on the reconstructed face mesh model based on the original resolution.

12. A non-transitory computer-readable storage medium storing a computer program, wherein the computer program, when run by a processor, causes the processor to perform a method for reconstructing a face mesh model comprising:
acquiring face scanning data to be reconstructed and a three-dimensional (3D) face mesh template;
obtaining a target face mesh model by hierarchically extracting key feature points in the 3D face mesh template and by sequentially deforming the 3D face mesh template based on posture matching positions of the hierarchically extracted key feature points in the face scanning data, wherein the key feature points are local feature points in the 3D face mesh template and represent facial features and position details; and
obtaining a reconstructed face mesh model by acquiring global feature points in the target face mesh model and by deforming the target face mesh model based on the posture matching positions of the global feature points in the face scanning data, wherein the global feature points are all mesh vertices distributed in the target face mesh model,
wherein hierarchically extracting key feature points in the 3D face mesh template comprises:
continually extracting key feature points from the remaining feature points except previously extracted key feature points from a previous deformed 3D face mesh template.

13. The storage medium according to claim 12, wherein sequentially deforming the 3D face mesh template based on the posture matching positions of the hierarchically extracted key feature points in the face scanning data comprises:
determining, using an iterative closest point (ICP) algorithm, the posture matching positions of the hierarchically extracted key feature points in the face scanning data; and
sequentially deforming, using a 3D mesh registration algorithm, the 3D face mesh template based on the posture matching positions of the hierarchically extracted key features points in the face scanning data.

14. The storage medium according to claim 12, wherein prior to hierarchically extracting the key feature points in the 3D face mesh template, the method performed by the processor further comprises:

acquiring original resolution of the 3D face mesh template and determining mesh precision of the 3D face mesh template based on the original resolution; and obtaining a subdivided 3D face mesh template by performing curved-surface subdivision on the 3D face mesh template in response to the mesh precision of the 3D face mesh template being lower than a predetermined precision threshold.

15. The storage medium according to claim 14, wherein in response to obtaining the reconstructed face mesh model, the method performed by the processor further comprises:

obtaining a reconstructed face mesh model of the original resolution by performing precision restoration on the reconstructed face mesh model based on the original resolution.

16. The storage medium according to claim 13, wherein prior to hierarchically extracting the key feature points in the 3D face mesh template, the method performed by the processor further comprises:

acquiring original resolution of the 3D face mesh template and determining mesh precision of the 3D face mesh template based on the original resolution; and obtaining a subdivided 3D face mesh template by performing curved-surface subdivision on the 3D face mesh template in response to the mesh precision of the 3D face mesh template being lower than a predetermined precision threshold.

\* \* \* \* \*